(12) United States Patent
Woo

(10) Patent No.: US 11,167,710 B2
(45) Date of Patent: Nov. 9, 2021

(54) AIRBAG DRIVING APPARATUS FOR VEHICLE AND CONTROL METHOD THEREOF

(71) Applicant: Hyundai Mobis Co., Ltd., Seoul (KR)

(72) Inventor: Heung Soon Woo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 75 days.

(21) Appl. No.: 16/460,501

(22) Filed: Jul. 2, 2019

(65) Prior Publication Data
US 2020/0001811 A1 Jan. 2, 2020

(30) Foreign Application Priority Data

Jul. 2, 2018 (KR) ........................ 10-2018-0076307

(51) Int. Cl.
*B60R 21/0132* (2006.01)
*B60R 21/0136* (2006.01)
*B60R 21/01* (2006.01)

(52) U.S. Cl.
CPC ...... *B60R 21/0132* (2013.01); *B60R 21/0136* (2013.01); *B60R 2021/01211* (2013.01); *B60R 2021/01286* (2013.01)

(58) Field of Classification Search
CPC ............ B60R 21/0132; B60R 21/0136; B60R 2021/01286; B60R 2021/01211; B60R 21/013; B60R 21/16; B60R 2021/01122
See application file for complete search history.

(56) References Cited

U.S. PATENT DOCUMENTS

2009/0167005 A1* 7/2009 Oowada .............. B60R 21/0132
280/735
2010/0312435 A1* 12/2010 Mase ................ B60R 21/01336
701/46

FOREIGN PATENT DOCUMENTS

| DE | 19850851 | 4/2000 | |
|---|---|---|---|
| DE | 10 2004 057 689 | 6/2006 | |
| DE | 10 2005 044 768 | 4/2007 | |
| DE | 10 2011 075 545 | 11/2012 | |
| DE | 10 2013 101 342 | 8/2013 | |
| WO | WO 2006/103810 A1 * | 5/2006 | ......... B60R 21/0132 |

\* cited by examiner

*Primary Examiner* — Brian P Sweeney
(74) *Attorney, Agent, or Firm* — H.C. Park & Associates, PLC

(57) ABSTRACT

An airbag driving apparatus for a vehicle may include: a first acceleration sensor configured to sense acceleration of a vehicle; a collision sensor configured to sense an impact applied to the vehicle; an airbag controller configured to receive a first acceleration value and an impact value from the first acceleration sensor and the collision sensor, determine a collision state of the vehicle, and transmit an ignition command for driving an airbag; and a driving controller comprising a second acceleration sensor installed therein to sense the acceleration of the vehicle, and configured to determine a deployment possibility of the airbag based on a second acceleration value of the second acceleration sensor, receive the ignition command from the airbag controller, and output an airbag deployment signal to the airbag.

7 Claims, 4 Drawing Sheets

AIRBAG DRIVING APPARATUS FOR VEHICLE AND CONTROL METHOD THEREOF

CROSS-REFERENCE TO RELATED APPLICATION

This application claims priority from and the benefit of Korean Patent Application No. 10-2018-0076307, filed on Jul. 2, 2018, which is hereby incorporated by reference for all purposes as if set forth herein.

BACKGROUND

Field

Exemplary embodiments relate to an airbag driving apparatus for a vehicle and a control method thereof, and more particularly, to an airbag driving apparatus for a vehicle, which includes acceleration sensors in a microcomputer and a separate controller for driving an airbag, respectively, and not only senses a collision state in cooperation with the microcomputer but also senses a collision state through the acceleration sensor in the separate controller, thereby preventing misdeployment of the airbag, and a control method thereof.

Discussion of the Background

In general, an airbag apparatus for a vehicle is installed in a vehicle, in order to protect a passenger from impact in case of a collision accident, the passenger being seated in a driver seat or passenger seat.

The airbag apparatus for a vehicle roughly includes a cushion for protecting a passenger and an inflator for supplying gas to the cushion. In order to deploy the cushion at low pressure and high pressure, dual inflators may be used.

Such an airbag apparatus receives a sensing signal from an acceleration sensor or gyro sensor in case of a collision accident, determines whether a collision or turn-over occurred, and deploys the airbag by operating an ignition switch depending on the determination result.

At this time, the airbag apparatus processes the sensing signal of the separate acceleration sensor or gyro sensor, and determines whether the airbag can be deployed, through a safing algorithm, in order to prevent misdeployment of the airbag. Then, according to an "AND" combination of the sensing signal and an airbag deployment signal, the airbag apparatus deploys the airbag.

When the collision sensing algorithm and the safing algorithm for airbag deployment are performed by one microcomputer, a risk of airbag misdeployment is present in the case that a failure occurs in the microcomputer.

The above information disclosed in this Background section is only for enhancement of understanding of the background of the invention and, therefore, it may contain information that does not constitute prior art.

SUMMARY

Exemplary embodiments of the present invention provide an airbag driving apparatus for a vehicle, which includes acceleration sensors in a microcomputer and a separate controller for driving an airbag, respectively, and not only senses a collision state in cooperation with the microcomputer but also senses a collision state through the acceleration sensor in the separate controller, thereby preventing misdeployment of the airbag, and a control method thereof.

Additional features of the invention will be set forth in the description which follows, and in part will be apparent from the description, or may be learned by practice of the invention.

In one embodiment, an airbag driving apparatus for a vehicle may include: a first acceleration sensor configured to sense acceleration of a vehicle; a collision sensor configured to sense an impact applied to the vehicle; an airbag controller configured to receive a first acceleration value and an impact value from the first acceleration sensor and the collision sensor, determine a collision state of the vehicle, and transmit an ignition command for driving an airbag; and a driving controller comprising a second acceleration sensor installed therein to sense the acceleration of the vehicle, and configured to determine a deployment possibility of the airbag based on a second acceleration value of the second acceleration sensor, receive the ignition command from the airbag controller, and output an airbag deployment signal to the airbag.

The driving controller may determine the deployment possibility of the airbag, and transmits the determination result to the airbag controller.

The airbag controller may receive the second acceleration value of the second acceleration sensor from the driving controller, and determine whether a collision occurred, based on the second acceleration value, the first acceleration value and the impact value, in order to determine whether to operate the airbag.

The driving controller may determine the deployment possibility of the airbag by determining whether the second acceleration value is maintained at a preset value or more for a preset time or more.

The driving controller may determine the deployment possibility of the airbag by comparing the second acceleration value to a collision reference waveform.

In another embodiment, a control method of an airbag driving apparatus for a vehicle may include: receiving, by an airbag controller, a first acceleration value and an impact value from a first acceleration sensor and a collision sensor; determining, by the airbag controller, a collision state of a vehicle based on the first acceleration value and the impact value; transmitting, by the airbag controller, an ignition command for driving an airbag to a driving controller according to the determination result of the collision state; receiving, by the driving controller, the ignition command and determining a deployment possibility of the airbag; and outputting, by the driving controller, an airbag deployment signal to the airbag according to the determination result of the deployment possibility of the airbag.

The determining of the collision state of the vehicle may include receiving, by the airbag controller, a second acceleration value from a second acceleration sensor included in the driving controller, and determining the collision state based on the second acceleration value, the first acceleration value and the impact value.

The determining of the deployment possibility of the airbag may include determining, by the driving controller, determining the deployment possibility of the airbag by determining whether the second acceleration value of the second acceleration sensor included in the driving controller is maintained at a preset value or more for a preset time or more.

The determining of the deployment possibility of the airbag may include determining, by the driving controller, the deployment possibility of the airbag by comparing the second acceleration value of the second acceleration sensor included in the driving controller to a collision reference waveform.

The determining of the deployment possibility of the airbag may further include determining, by the driving controller, the deployment possibility of the airbag, and then transmitting the determination result to the airbag controller.

In accordance with the embodiments of the present invention, the airbag driving apparatus for a vehicle and the control method thereof may include the acceleration sensors which are installed in the microcomputer and the separate controller for driving the airbag, respectively, and not only sense the collision state in cooperation with the microcomputer, but also sense the collision state through the acceleration sensor in the separate controller, thereby preventing misdeployment of the airbag. Thus, the airbag driving apparatus and the control method can reduce a risk of misdeployment due to a failure of the microcomputer, and reduce a cost for installing the acceleration sensor because the acceleration sensor for safing driving is installed in the separate controller.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
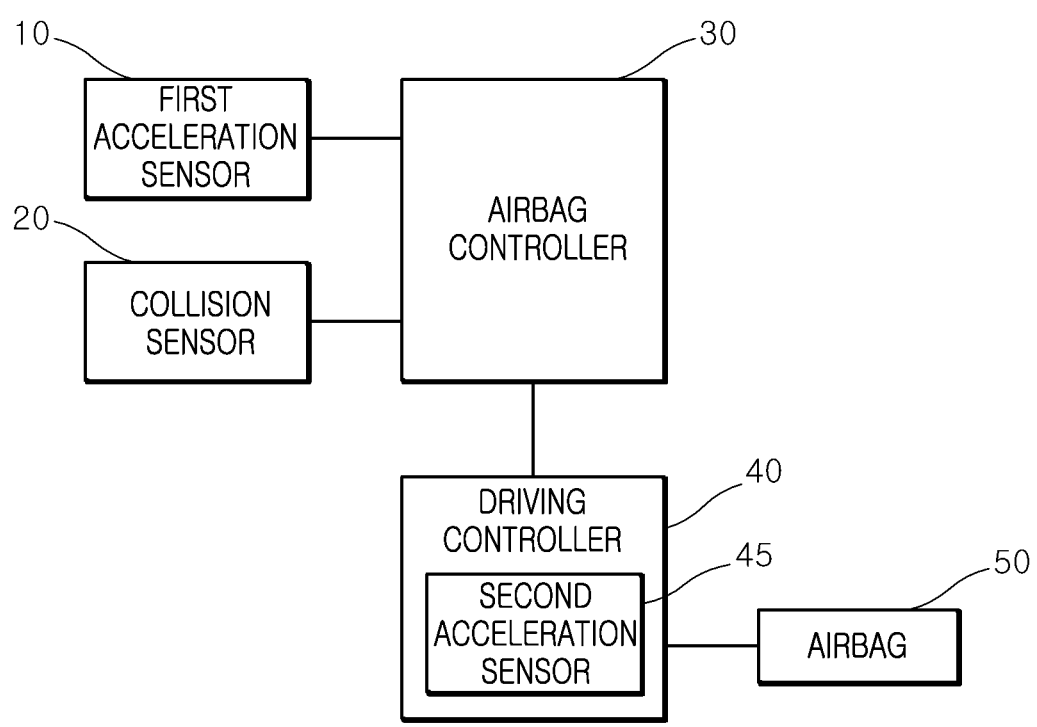
FIG. 1 is a block diagram illustrating an airbag driving apparatus for a vehicle in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, an airbag driving apparatus for a vehicle and a control method thereof in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2A:
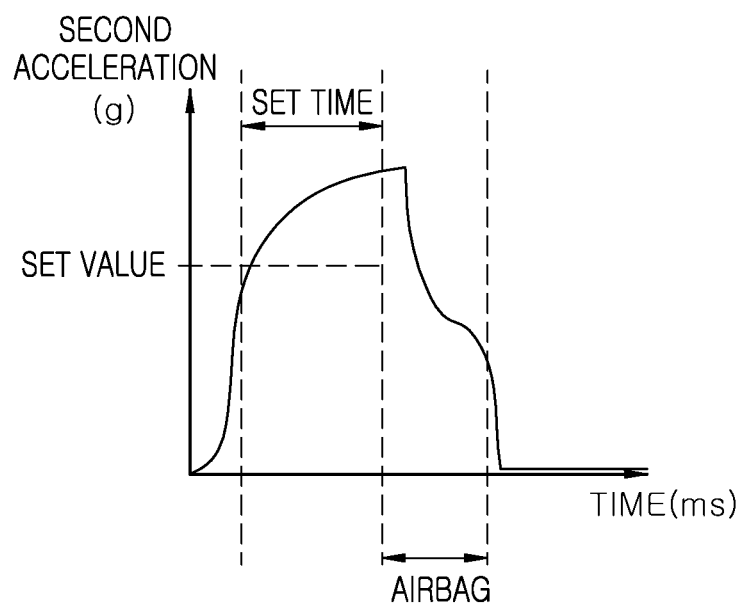
FIGS. 2A and 2B are graphs for determining the possibility that an airbag can be deployed according to a first mode in the airbag driving apparatus for a vehicle in accordance with the embodiment of the present invention.
Figure 2B:
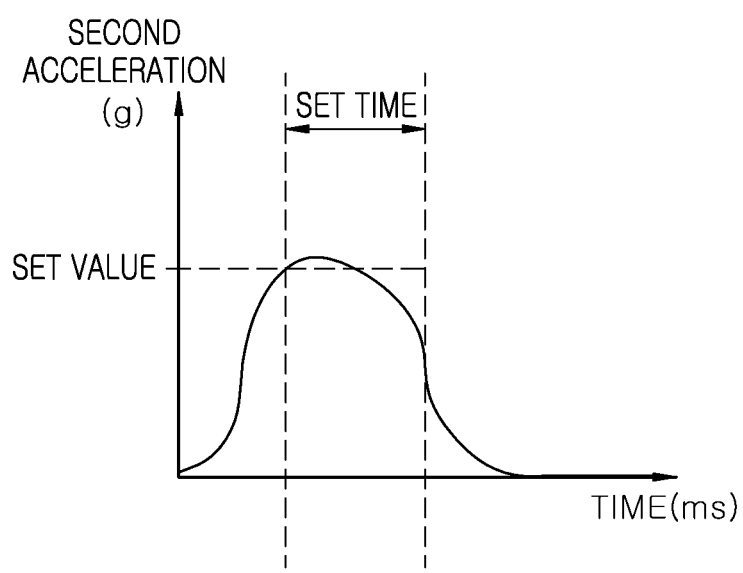
Figure 3:
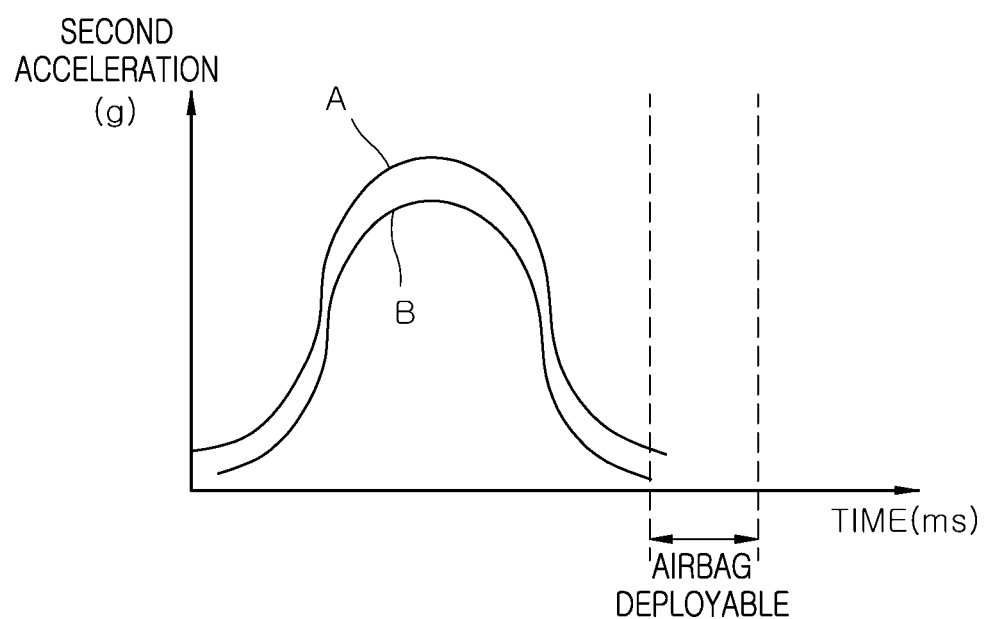
FIG. 3 is a graph for determining the possibility that the airbag can be deployed according to a second mode in the airbag driving apparatus for a vehicle in accordance with the embodiment of the present invention.

FIG. 1 is a block diagram illustrating an airbag driving apparatus for a vehicle in accordance with an embodiment of the present invention, FIGS. 2A and 2B are graphs for determining the possibility that an airbag can be deployed according to a first mode in the airbag driving apparatus for a vehicle in accordance with the embodiment of the present invention, and FIG. 3 is a graph for determining the possibility that the airbag can be deployed according to a second mode in the airbag driving apparatus for a vehicle in accordance with the embodiment of the present invention.

As illustrated in FIG. 1, the airbag driving apparatus for a vehicle in accordance with the embodiment of the present invention may include a first acceleration sensor 10, a collision sensor 20, an airbag controller 30 and a driving controller 40.

The first acceleration sensor 10 may sense acceleration of the vehicle and provide a first acceleration value to the airbag controller 30, and the airbag controller 30 may determine a collision state of the vehicle and thus determine whether to drive an airbag 50.

The collision sensor 20 may sense impact applied to the vehicle and provide an impact value to the airbag controller 30. Thus, the airbag controller 30 may determine the collision state of the vehicle and thus determine whether to drive the airbag 50.

The airbag controller 30 may receive the first acceleration value and the impact value from the first acceleration sensor 10 and the collision sensor 20, determine the collision state of the vehicle, and transmit an ignition command to the driving controller 40 to drive the airbag 50.

The driving controller 40 may include a second acceleration sensor 45 installed therein to sense the acceleration of the vehicle, determine the possibility that the airbag 50 can be deployed, based on a second acceleration value of the second acceleration sensor 45, receive the ignition command from the airbag controller 30, and output an airbag deployment signal to the airbag 50.

The second acceleration sensor 45 in the driving controller 40 may be installed in the form of ASIC (Application Specific Integrated Circuit), and the driving controller 40 may transmit the second acceleration value of the second acceleration sensor 45 installed therein to the airbag controller 30 through SPI (Serial Peripheral Interface) communication.

For example, the second acceleration sensor 45 may measure an acceleration of ±50 g or more in units of 0.02 g, based on the traveling direction of the vehicle, and output the measured value as the second acceleration value.

Therefore, when receiving the second acceleration value from the driving controller 40, the airbag controller 30 may determine the collision state of the vehicle based on the second acceleration value, the first acceleration value and the impact value.

The driving controller 40 may determine the deployment possibility of the airbag 50, and transmit the determination result to the airbag controller 30.

In the present embodiment, when determining the deployment possibility of the airbag 50 based on the second acceleration value, the driving controller 40 may determine whether the second acceleration value is maintained at a preset value or more for a preset time or more as illustrated in FIGS. 2A and 2B, according to the first mode. When the second acceleration value is maintained at the preset value or more for the preset time or more as illustrated in FIG. 2A, the driving controller 40 can control the airbag 50 to be deployed for a possible deployment time.

Therefore, when the ignition command for driving the airbag 50 is received from the airbag controller 30 for the possible deployment time in which the airbag can be deployed, the driving controller 40 may output the airbag deployment signal to the airbag 50.

On the other hand, when the second acceleration value is not maintained at the preset value or more for the preset time or more as illustrated in FIG. 2B, the driving controller 40 may not output the airbag deployment signal even though the ignition command is received from the airbag controller 30. Then, the airbag 50 cannot be deployed.

When determining the deployment possibility of the airbag 50 based on the second acceleration value, the driving controller 40 may compare an input waveform B of the second acceleration value to a collision reference waveform A according to the second mode as illustrated in FIG. 3. When the input waveform B of the second acceleration value is similar to the collision reference waveform A, the driving controller 40 can control the airbag 50 to be deployed for the possible deployment time.

In accordance with the embodiment of the present invention, the airbag driving apparatus for a vehicle may include the acceleration sensors which are installed in the microcomputer and the separate controller for driving the airbag, respectively, and not only sense the collision state in cooperation with the microcomputer, but also sense the collision state through the acceleration sensor in the separate controller, thereby preventing misdeployment of the airbag. Thus, the airbag driving apparatus can reduce a risk of misdeployment due to a failure of the microcomputer, and reduce a cost for installing the acceleration sensor because the acceleration sensor for safing driving is installed in the separate controller.

Figure 4:
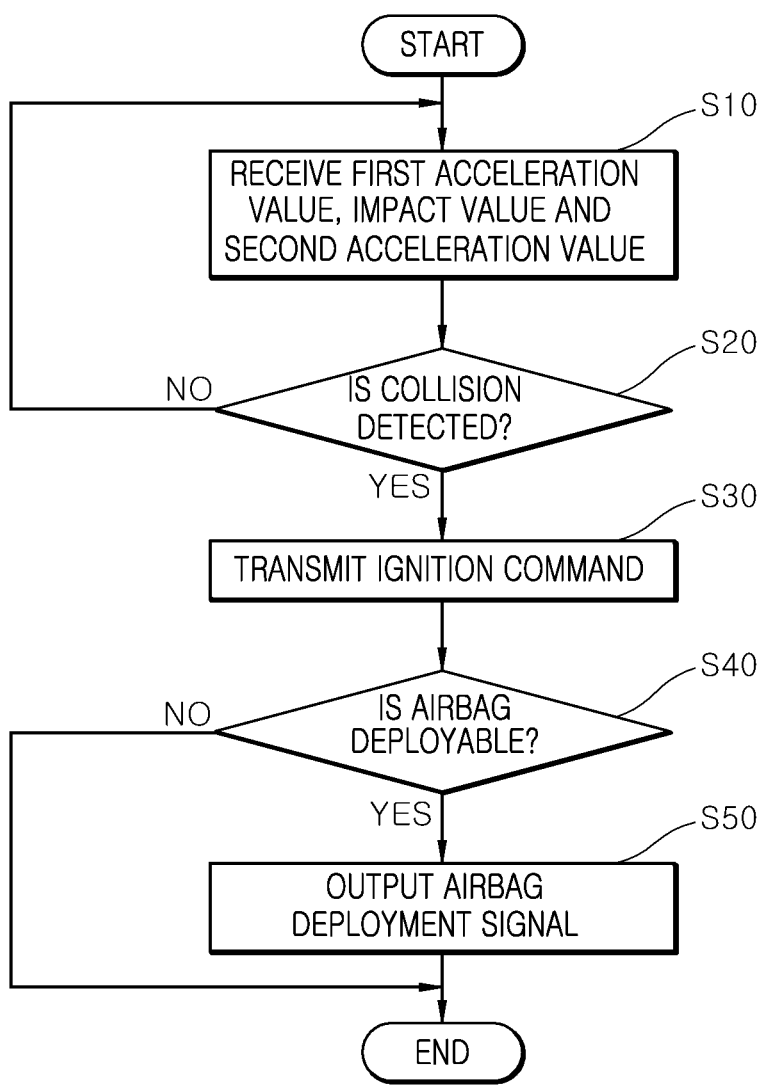
FIG. 4 is a flowchart for describing a control method of the airbag driving apparatus for a vehicle in accordance with an embodiment of the present invention.

FIG. 4 is a flowchart for describing a control method of the airbag driving apparatus for a vehicle in accordance with an embodiment of the present invention.

As illustrated in FIG. 4, the control method of the airbag driving apparatus for a vehicle in accordance with the embodiment of the present invention may start from step S10 in which the airbag controller 30 receives a first acceleration value and an impact value from the first acceleration sensor 10 and the collision sensor 20.

In step S10, the airbag controller 30 may receive a second acceleration value from the second acceleration sensor 45 included in the driving controller 40 through SPI communication.

In step S20, the airbag controller 30 receiving the first acceleration value and the impact value in step S10 may determine a collision state of the vehicle, based on the first acceleration value and the impact value.

When receiving the second acceleration value from the driving controller 40, the airbag controller 30 may determine the collision state of the vehicle based on the second acceleration value, the first acceleration value and the impact value.

When the determination result of step S20 indicates that no collision is detected, the airbag controller 30 may return to step S10 in which the airbag controller 30 receives the first acceleration value, the impact value, and the second acceleration value and determines the collision state.

On the other hand, when the determination result of step S20 indicates that a collision was detected, the airbag controller 30 may transmit an ignition command for driving the airbag 50 to the driving controller 40 in step S30.

When receiving the ignition command from the airbag controller 30 in step S30, the driving controller 40 may determine whether the airbag 50 can be deployed, in step S40.

In step S40 for determining whether the airbag 50 can be deployed, the driving controller 40 may determine whether the second acceleration value is maintained at a preset value or more for a preset time or more according to the first mode as illustrated in FIGS. 2A and 2B. When the second acceleration value is maintained at the preset value or more for the preset time or more as illustrated in FIG. 2A, the driving controller 40 may control the airbag 50 to be deployed for a possible deployment time.

On the other hand, when the second acceleration value is not maintained at the preset value or more for the preset time or more as illustrated in FIG. 2B, the driving controller 40 may not output the airbag deployment signal even though the ignition command is received from the airbag controller 30. Then, the airbag 50 cannot be deployed.

In step S40 of determining whether the airbag 50 can be deployed, the driving controller 40 may compare the input waveform B of the second acceleration value to the collision reference waveform A according to the second mode as illustrated in FIG. 3. When the input waveform B of the second acceleration value is similar to the collision reference waveform A, the driving controller 40 can control the airbag 50 to be deployed for the possible deployment time.

In step S40, the driving controller 40 may determine whether the airbag 50 can be deployed, and transmit the determination result to the airbag controller 30.

When the determination result of step S40 indicates that the airbag 50 cannot be deployed, the driving controller 40 may end the process without outputting the airbag deployment signal to the airbag 50 even though the ignition command is received. Thus, the driving controller 40 can control the airbag 50 not to be deployed, thereby preventing misdeployment of the airbag 50.

However, when the determination result of step S40 indicates that the airbag 50 can be deployed, the driving controller 40 may output the airbag deployment signal to the airbag 50 in the case that the ignition command is received, such that the airbag 50 can be deployed, in step S50.

In accordance with the embodiment of the present invention, the control method of the airbag driving apparatus for a vehicle may include the acceleration sensors which are installed in the microcomputer and the separate controller for driving the airbag, respectively, and not only sense the collision state in cooperation with the microcomputer, but also sense the collision state through the acceleration sensor in the separate controller, thereby preventing misdeployment of the airbag. Thus, the control method can reduce a risk of misdeployment due to a failure of the microcomputer, and reduce a cost for installing the acceleration sensor because the acceleration sensor for safing driving is installed in the separate controller.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An airbag driving apparatus for a vehicle, comprising:
   a microcomputer comprising a first acceleration sensor configured to sense a first acceleration value of the vehicle;
   a collision sensor configured to sense an impact applied to the vehicle;
   an airbag controller configured to receive the first acceleration value and an impact value from the first acceleration sensor of the microcomputer and the collision sensor, respectively, to determine a collision state of the vehicle, and to transmit an ignition command for driving an airbag; and
   a driving controller comprising a second acceleration sensor installed therein configured to sense a second acceleration value of the vehicle, to determine a deployment possibility of the airbag based on the second acceleration value of the second acceleration sensor, to receive the ignition command from the airbag controller, and to output an airbag deployment signal to the airbag,
   wherein the driving controller is configured to determine the deployment possibility of the airbag by determining whether the second acceleration value is maintained at a preset value or more for a preset time period or more, and
   wherein, when the second acceleration value is not maintained at the preset value or more for the preset time period or more, the driving controller does not output the airbag deployment signal even though the ignition command is received from the airbag controller in order for the airbag to not be deployed,
   wherein the airbag controller receives input from the first acceleration sensor via the microcomputer, and the driving controller comprises a separate controller than the microcomputer, and wherein when the airbag controller malfunctions and outputs the ignition command, the airbag will not be deployed unless the driving controller determines that the second acceleration value is maintained at the preset value or more for the preset time period of more.

2. The airbag driving apparatus of claim 1, wherein the driving controller is configured to determine the deployment possibility of the airbag as a determination result, and to transmit the determination result to the airbag controller.

3. The airbag driving apparatus of claim 1, wherein the airbag controller is configured to receive the second acceleration value of the second acceleration sensor from the driving controller, and to determine whether a collision occurred, based on the second acceleration value, the first acceleration value and the impact value, in order to determine whether to operate the airbag.

4. The airbag driving apparatus of claim 1, wherein the driving controller is configured to determine the deployment possibility of the airbag by comparing the second acceleration value to a collision reference waveform.

5. A control method of an airbag driving apparatus for a vehicle, comprising the steps of:
   receiving, by an airbag controller, a first acceleration value and an impact value from a first acceleration sensor and a collision sensor;
   determining, by the airbag controller, a collision state of a vehicle based on the first acceleration value and the impact value;

transmitting, by the airbag controller, an ignition command for driving an airbag to a driving controller according to the determination result of the collision state;

receiving, by the driving controller, the ignition command and determining a deployment possibility of the airbag as a determination result; and outputting, by the driving controller, an airbag deployment signal to the airbag according to the determination result of the deployment possibility of the airbag, wherein the step of determining of the collision state of the vehicle comprises the step of receiving, by the airbag controller, a second acceleration value from a second acceleration sensor included in the driving controller, and the step of determining the collision state based on the second acceleration value, the first acceleration value and the impact value, wherein the step of determining of the deployment possibility of the airbag comprises the step of determining, by the driving controller, determining the deployment possibility of the airbag by determining whether the second acceleration value of the second acceleration sensor included in the driving controller is maintained at a preset value or more for a preset time period or more, wherein, when the second acceleration value is not maintained at the preset value or more for the preset time period or more, the driving controller does not output the airbag deployment signal even though the ignition command is received from the airbag controller in order for the airbag to not be deployed, wherein the airbag driving apparatus further comprises a microcomputer that includes the first acceleration sensor and receives input therefrom and provides the input from the first acceleration sensor to the airbag controller, and the driving controller comprises the second acceleration sensor and a separate controller than the microcomputer, and wherein when the airbag controller malfunctions and outputs the ignition command, the airbag will not be deployed unless the driving controller determines that the second acceleration value is maintained at the preset value or more for the preset time period of more.

6. The control method of claim 5, wherein the step of determining of the deployment possibility of the airbag comprises the step of determining, by the driving controller, the deployment possibility of the airbag by comparing the second acceleration value of the second acceleration sensor included in the driving controller to a collision reference waveform.

7. The control method of claim 5, wherein the step of determining of the deployment possibility of the airbag further comprises the step of determining, by the driving controller, the deployment possibility of the airbag, and then transmitting the determination result to the airbag controller.

* * * * *